United States Patent [19]
Gable et al.

[11] Patent Number: 4,466,279
[45] Date of Patent: Aug. 21, 1984

[54] AUTOMATED MANUAL TRANSMISSION SHIFTER

[75] Inventors: Stewart V. Gable, Ypsilanti; Robert N. Glover, Livonia; Francis G. King, Birmingham; Raymond C. Meier, Jr., Canton, all of Mich.

[73] Assignee: Ford Motor Company, Dearborn, Mich.

[21] Appl. No.: 421,559

[22] Filed: Sep. 22, 1982

[51] Int. Cl.³ .............................................. G01M 15/00
[52] U.S. Cl. ..................................... 73/117; 74/473 R
[58] Field of Search .................... 73/116, 117; 74/335, 74/336 R, 336.5, 337, 365, 473 R, 856, 877

[56] References Cited

U.S. PATENT DOCUMENTS

| | | | |
|---|---|---|---|
| 2,219,323 | 10/1940 | Kliesrath | 74/336.5 X |
| 2,281,159 | 4/1942 | Kliesrath et al. | 74/877 X |
| 3,465,577 | 9/1969 | Donovan | 73/117 |
| 3,516,287 | 6/1970 | Masuda et al. | 73/117 |
| 3,713,332 | 1/1973 | Herrbrich | 73/117 |

FOREIGN PATENT DOCUMENTS

2528920 1/1977 Fed. Rep. of Germany ........ 73/117
539549 2/1977 U.S.S.R. ........................... 74/473 R
802829 2/1981 U.S.S.R. ................................. 73/117

Primary Examiner—Lawrence J. Staab
Assistant Examiner—Dwight G. Diehl
Attorney, Agent, or Firm—Peter Abolins; Robert D. Sanborn

[57] ABSTRACT

A gear shifting mechanism includes an actuator for fore-aft movement with a tachometer and a linear displacement transducer to form a velocity and position feedback actuator. The gear shifting mechanism also includes a solenoid and a pivotal mounting to provide movement of the actuator assembly in a second direction, i.e. from first-second to third-fourth gear shift positions. A second pivotal mounting allows the actuator assembly to follow the curvilinear travel of the gear shift level which is facilitated by the ball joint attachment to the gear shift lever. A spring loaded mounting bracket provides force cushioning to the said gear shift lever. The actuator assembly is mounted on a base plate with legs to straddle the vehicle's floor hump and to secure the said base plate by mounting bolts to engage the vehicle's seat belt anchor openings.

6 Claims, 3 Drawing Figures

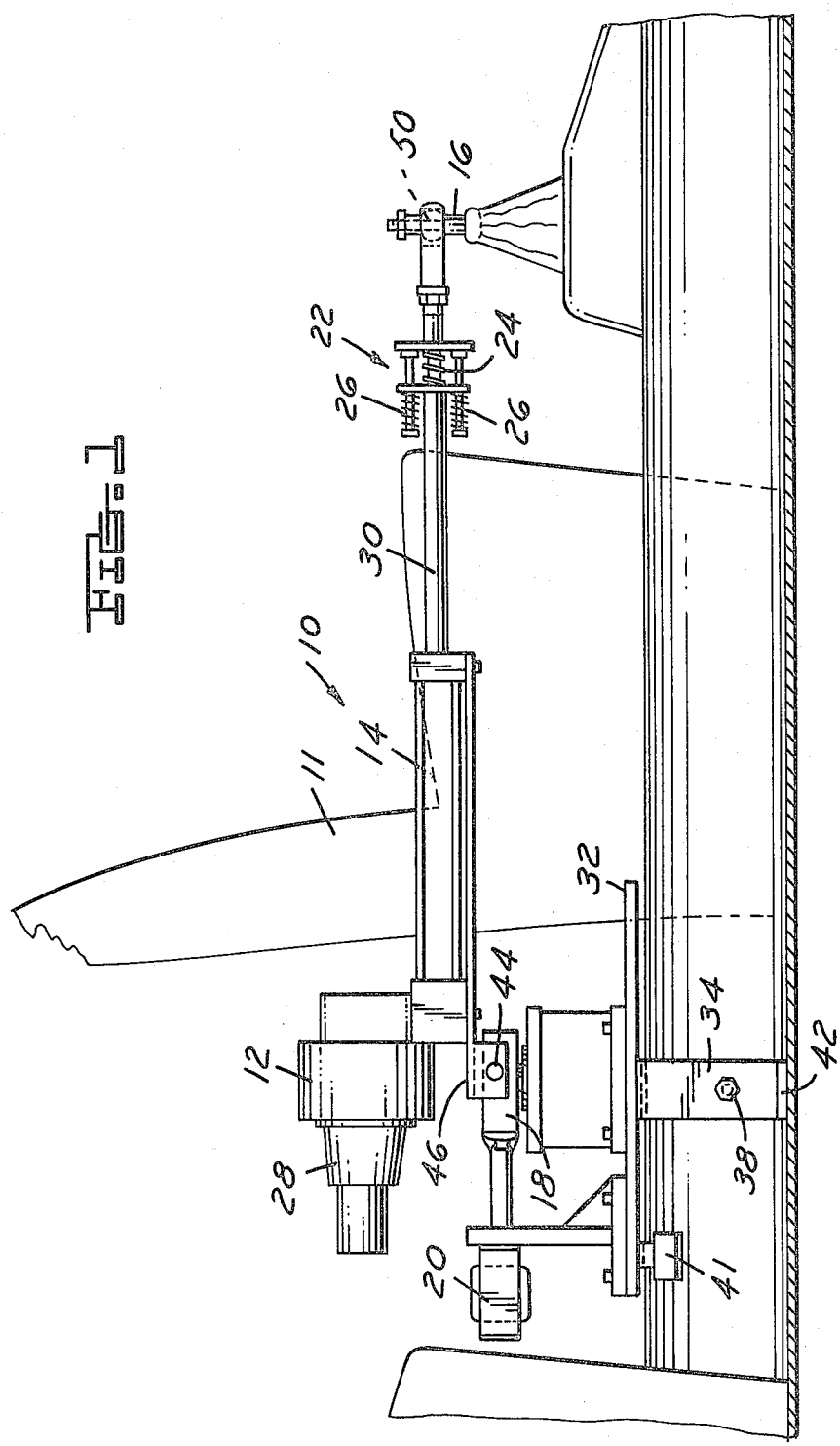

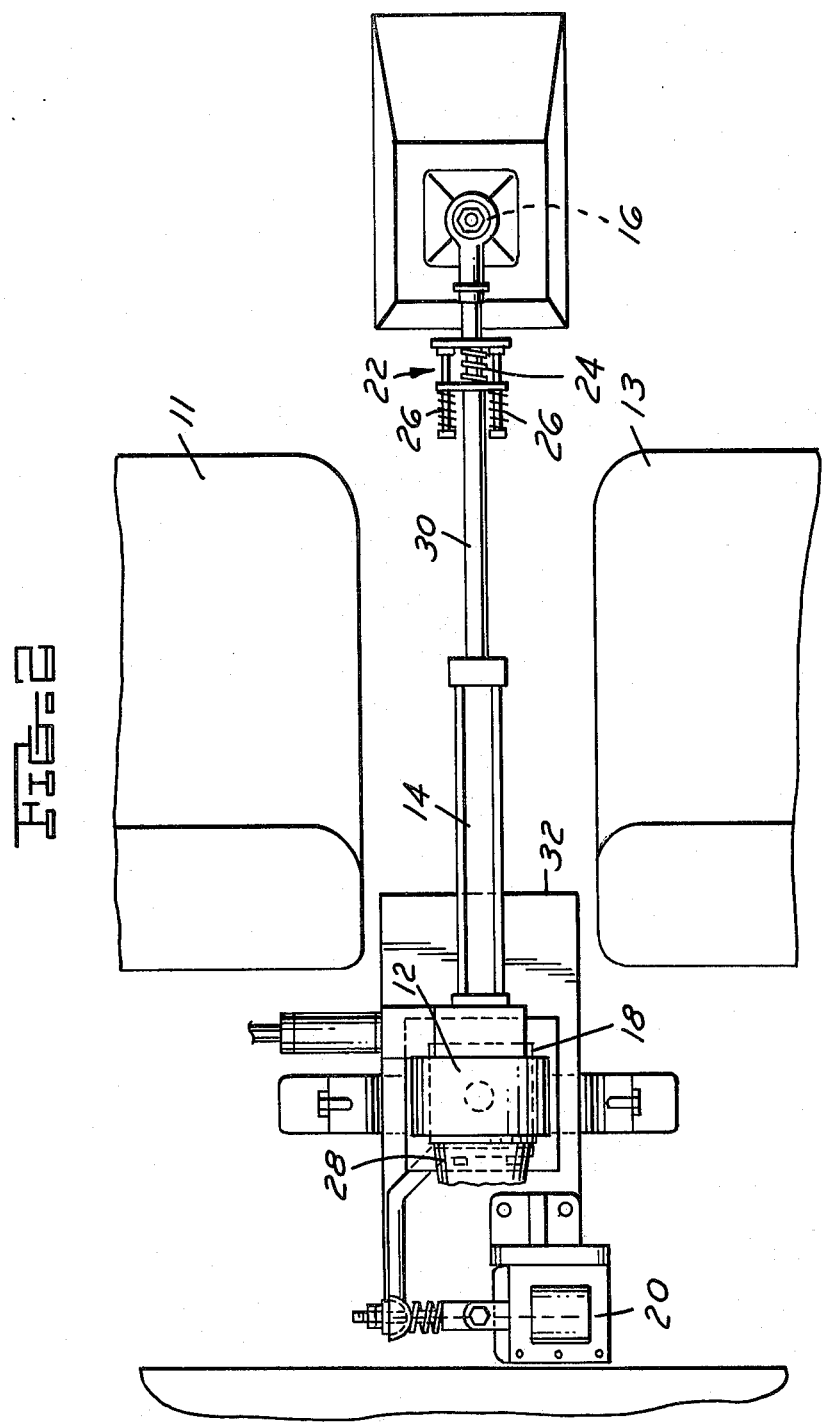

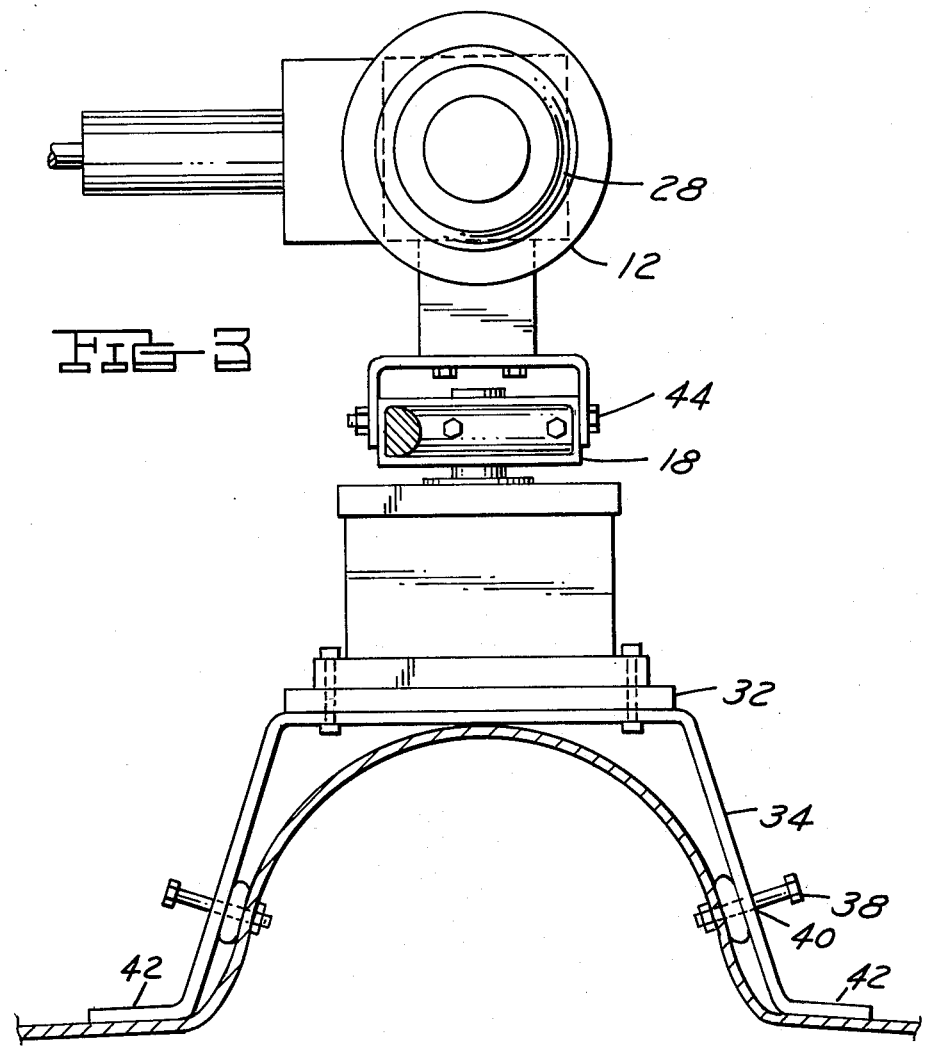

AUTOMATED MANUAL TRANSMISSION SHIFTER

This application is related to commonly assigned copending applications Ser. No. 421,640 filed Sept. 22, 1982 entitled "Automated Automotive Control Actuator" by F. G. King et al and Ser. No. 421,556, filed Sept. 22, 1982, entitled "Automatic Driver System" by S. V. Gable et al.

BACKGROUND OF THE INVENTION

1. Technical Field

This invention relates to apparatus for manipulating the controls of an automobile.

2. Prior Art

U.S. Pat. No. 2,281,159 to Kliesrath et al discloses a transmission operating mechanism including a vacuum operated motor 20 connected to a lever 26. A vacuum operated motor for the gear shifter is mounted on the dashboard while a vacuum operated motor for the clutch is mounted behind the fire wall.

U.S. Pat. No. 3,713,332 to Herrbrich teaches an automatic manual transmission shifting mechanism including working cylinders 15 and 16 attached to gear shift lever 20 and the cylinder 14 attached to a clutch pedal 19. This system uses a double pneumatic cylinder system on a base frame, the installation of which requires the removal of the driver's seat.

U.S. Pat. No. 3,465,577 issued to Donovan teaches an automatic manual transmission shifter including hydraulic cylinders 76 and 78 attached to column gear shift lever 26 and hydraulic cylinder 34 attached to clutch pedal 16. In this system the hydraulic cylinders for column shifting are mounted on an external support which extends into the vehicle.

U.S. Pat. No. 3,516,287 issued to Masuda et al teaches a servo cylinder 7, lever select cylinder 43 and side shift cylinder 44. The system is designed for use with a dynamometer test platform where the hydraulic cylinders are mounted next to the power train components.

The uncovered prior art patents teach either a pneumatic or hydraulic system for actuation of the automobile control apparatus. None of the uncovered patents use an electric motor for actuation. There still remains a need for improved ease of installation. The installation apparatus itself should be relatively simple and capable of being installed in a relatively short time. Easy and rapid installation is advantageous when it is necessary to move the mechanism for actuating the automotive controls from vehicle to vehicle for successive testing of the vehicles. These are some of the problems this invention overcomes.

SUMMARY OF THE INVENTION

An automated driver system for a manual transmission vehicle includes a gear shifting mechanism under control of a microprocessor and installed within the passenger compartment of a vehicle. The gear shifting mechanism includes a gear shift actuator with a DC motor, tachometer and lead screw assembly, a linear displacement transducer, a base mounting plate, a lazy susan mounting mechanism for the gear shift actuator, a solenoid and a spring loaded mounting bracket. The solenoid exerts a sideward force on the actuator for movement of the gear shifter from the first-second gear shift position to the third-fourth gear shift position. The legs from the mounting plate straddle the center hump of the vehicle. The actuator is mounted on a pivoting plate with a horizontal pivot axis so the actuator can rock up and down to follow the curvilinear travel of the gear shift. The pivoting plate sits on the lazy susan mounting to facilitate motion from the first-second to the third-fourth gear shift positions. The actuator with its tachometer and direct current displacement transducer forms a velocity and position feedback actuator. The spring loaded bracket absorbs the force of the actuator when it reaches its extreme positions of travel in the fore-aft direction.

A gear shifting mechanism in accordance with an embodiment of this invention is particularly advantageous for automatic operation of a vehicle on a dynamometer. For example, to comply with certain government emission requirements involves the testing of numerous vehicles. Use of an embodiment of this invention provides for quicker, more consistent and less expensive actuation of such vehicles through a predetermined driving cycle relating velocity and time.

BRIEF DESCRIPTION OF THE DRAWINGS

FIG. 1 is a side view of an automated manual transmission shifter in accordance with an embodiment of this invention;

FIG. 2 is a plan view of the automated manual transmission shifter shown in FIG. 1; and FIG. 3 is a rear elevation view of the automated shifter shown in FIG. 1.

DETAILED DESCRIPTION OF THE INVENTION

Referring to FIG. 1, a gear shifting mechanism includes a DC motor 12 for providing power for linear velocity actuation and a lead screw assembly 14 coupled to DC motor 12 for providing forward and aft movement of a vehicle gear shift level 16. DC motor 12 is mounted on a lazy susan mounting mechanism 18. A double-acting solenoid 20 is coupled to lazy susan mechanism 18 to exert a sideways force on the combination of DC motor 12 and lead screw assembly 14 for movement of gear shift lever 16 from shifts between first and second gear to shifts between third and fourth gear.

A spring loaded mounting bracket 22 is used to couple lead screw assembly 14 to gear shift lever 16. Spring loaded mounting bracket 22 includes a spring 24 which compresses when lead screw assembly 14 causes forward motion. Spring loaded mounting bracket 22 also includes a pair of springs 26 which compress when lead screw assembly 14 causes movement aft. Spring loaded mounting bracket 22 absorbs the force of the actuator when the gear shifter reaches its point of furthest travel in the fore and aft direction. Spherical ball joint 50 couples spring loaded mounting bracket 22 to gear shift lever 16 and facilitates following the travel of gear shift lever 16.

The coupling between lazy susan mounting mechanism 18 and DC motor 12 includes a pivot 44 so that lead screw assembly 14 can move up and down in response to shifting of gear shift lever 16. Advantageously, lazy susan mounting mechanism 18 includes a bolt and two thrust bearings placed into lazy susan mounting mechanism 18 to prevent sideward rocking. Lead screw assembly 14 is mounted on a pivot plate 46 which is coupled through pivot point 44 to lazy susan mounting mechanism 18. As a result, lead screw assembly 14 can follow the curvilinear travel of gear shift lever 16.

A tachometer 28 is coupled to DC motor 12 to provide an indication of rotational velocity. A linear displacement transducer 30 is also coupled to lead screw assembly 14 to provide an indication of the fore and aft position of lead screw assembly 14. The combination of the tachometer and the linear displacement transducer forms a velocity and position feedback actuator.

Referring to FIG. 3, lazy susan mounting mechanism 18 and solenoid 20 are mounted on a base plate 32 which has a pair of legs 34 extending downward from base plate 32. Legs 34 straddle over the center hump of the vehicle. A pair of mounting screws 38 extend through openings 40 in the sides of legs 34 and are coupled to the transmission hump of the vehicle being tested. Mounting screws 38 are advantageously tapered and can be attached to the vehicle mounting for seat belts. Legs 34 include angled feet 42 which rest on the floor of the vehicle and provide additional support. A third locking screw 41 (FIG. 1) applies an upward pressure on the base plate 32 by pushing on the hump. This prevents any fore and aft rocking motion.

When mounting gear shifting mechanism 10 to a vehicle, a shifting knob is removed from gear shift lever 16 so that ball joint 50 can be slipped on gear shift lever 16. The seat belt mounts on the hump behind the front seats provide mounting openings for receiving mounting screws 38. Gear shifting mechanism 10 is particularly suited for vehicles having individual spaced front seats, such as seats 11 and 13 shown in FIG. 2. Assembly 14 can be mounted between seats 11 and 13 and extend forward from the mounting of DC motor 12 to gear shift lever 16.

In operation, DC motor 12 is a high speed motor which causes rapid axial actuation of lead screw assembly 14. Such actuation can be used, depending upon the direction, for shifts between first and second gears and for shifts between third and fourth gears. To provide for rotational movement between the angular position for shifts between first and second gears and the angular position for shifts between third and fourth gears solenoid 20 is actuated. Such actuation causes rotational movement of lazy susan mounting mechanism 18.

Various modifications and variations will no doubt occur to those skilled in the various arts to which this invention pertains. For example, the particular pivotal coupling may be varied from that disclosed herein. These and all other variations which basically rely on the teachings to which this disclosure has advanced the art are properly considered within the scope of this invention.

We claim:

1. A transmission gear shifting apparatus for the automatic operation of a manual gear shift mechanism in an automotive vehicle, the automotive vehicle having a gear shift lever with a plurality of manual shift positions, said gear shifting apparatus including:

a lead screw assembly means coupled to the gear shift lever for actuating movement of the gear shift lever in a first direction;

a DC motor coupled to the lead screw assembly means for providing turning of the screw and thereby rapid axial movement of the lead screw assembly facilitating movement of the gear shift lever in said first direction;

a pivotal mounting for said lead screw assembly for providing movement in a second direction, said second direction being generally perpendicular to said first direction;

a solenoid means for providing a force causing movement of said lead screw assembly in said second direction;

a tachometer means coupled to said DC motor for providing a velocity feedback; and a linear displacement transducer coupled to said lead screw assembly for providing a position feedback.

2. A gear shifting apparatus as recited in claim 1 wherein said lead screw assembly means further includes:

a spring loaded mounting bracket for providing force absorption in said first direction thereby cushioning a force applied to said gear shift lever, said spring loaded mounting bracket including a first spring means for providing compression and absorption of a driving force in said first direction, and a second spring means for absorption of the driving force in a direction opposite said first direction.

3. A gear shifting apparatus as recited in claim 2 wherein said lead screw assembly includes a ball joint for coupling to said gear shift lever.

4. A gear shifting mechanism as recited in claim 1 wherein said pivotal mounting includes a first axis mounting and a generally perpendicular second axis mounting so that said first direction is perpendicular to both axes of mounting, said pivotal mounting providing rotation around both said axes of mounting, so that rotation around said first axis of mounting allows movement of said lead screw assembly in said second direction while rotation around said second axis allows said lead screw assembly to follow curvilinear travel of the gear shift lever.

5. A gear shifting apparatus as recited in claim 4 wherein said pivotal mounting includes:

a lazy susan pivotal means for providing a movable plate rotationally coupled to a fixed plate about said first axis and a tilt plate rotationally coupled to said movable plate about said second axis.

6. A gear shifting apparatus as recited in claim 5 wherein said lead screw assembly is mounted on said tilt plate, said solenoid means is mounted on said movable plate and further comprising a pair of spaced legs extending from said fixed plate and being adapted to secure therebetween a floor hump of the automotive vehicle, said pair of spaced legs having a pair of mounting openings adapted to align with seat belt anchor openings in the automotive vehicle and further comprising a pair of mounting bolts passing through said mounting openings to engage the seat belt anchor openings.

* * * * *